(12) United States Patent
Talvitie et al.

(10) Patent No.: US 8,971,808 B2
(45) Date of Patent: Mar. 3, 2015

(54) PROCESSOR ARRANGEMENT FOR MULTI MODE WIRELESS DEVICE

(75) Inventors: Hannu Tapani Talvitie, Tampere (FI); Kim Kaltiokallio, Helsinki (FI); Ekaterina Pogosova, Tampere (FI)

(73) Assignee: Broadcom Corporation, Irvine, CA (US)

( * ) Notice: Subject to any disclaimer, the term of this patent is extended or adjusted under 35 U.S.C. 154(b) by 146 days.

(21) Appl. No.: 13/371,677

(22) Filed: Feb. 13, 2012

(65) Prior Publication Data

US 2013/0005396 A1    Jan. 3, 2013

Related U.S. Application Data

(63) Continuation of application No. 13/173,767, filed on Jun. 30, 2011.

(30) Foreign Application Priority Data

Jun. 30, 2011 (GB) .................................. 1111160.6

(51) Int. Cl.
*H04B 7/00* (2006.01)
*H04M 1/00* (2006.01)
*H04W 88/06* (2009.01)

(52) U.S. Cl.
CPC ....................................... *H04W 88/06* (2013.01)
USPC ........ 455/41.2; 455/522; 455/562.1; 370/329; 370/392; 370/395.1; 370/469; 713/2

(58) Field of Classification Search
CPC ..... H04W 84/18; H04W 88/06; H04W 52/24; H04W 52/50; H04W 52/367; H04M 1/7253
USPC .............. 455/41.2, 522, 562.1; 370/329, 392, 370/395.1, 469; 713/2
See application file for complete search history.

(56) References Cited

U.S. PATENT DOCUMENTS 6,490,283 B1 * 12/2002 Ganor et al. ................ 370/395.1
7,155,258 B1 * 12/2006 Cisar ........................... 455/562.1

(Continued)

FOREIGN PATENT DOCUMENTS

| EP | 2 187 400 A1 | 5/2010 |
| EP | 2 187 697 A1 | 5/2010 |
| WO | WO 2004/062137 A1 | 7/2004 |

OTHER PUBLICATIONS

Combined Search and Examination Report from corresponding United Kingdom Patent Application No. GB1111160.6, dated Oct. 20, 2011 (5 pages).

(Continued)

*Primary Examiner* — William D Cumming
(74) *Attorney, Agent, or Firm* — Oblon, McClelland, Maier & Neustadt, L.L.P.

(57) ABSTRACT

A multi mode wireless device can communicate with cellular and non-cellular networks. The device has first and second processors in communication with each other. In one arrangement, the first processor provides control processing for physical layer 1 processing for both the cellular and the non-cellular radio communications in parallel, and the second processor provides processing for data link layer 2 for both the cellular and the non-cellular radio communications in parallel, and the device can communicate with the cellular and non-cellular networks simultaneously. In another arrangement, the first processor provides control processing for physical layer 1 processing for both the cellular and the non-cellular radio communications in parallel, and the second processor provides processing for data link layer 2 and all layers above layer 2 in the device for both the cellular and the non-cellular radio communications in parallel.

21 Claims, 3 Drawing Sheets

(56) References Cited

U.S. PATENT DOCUMENTS

| | | | |
|---|---|---|---|
| 7,817,579 B2 | 10/2010 | Ramirez, II et al. | |
| 7,860,125 B2* | 12/2010 | Bains et al. | 370/469 |
| 7,899,483 B2* | 3/2011 | Ariyur | 455/522 |
| 7,916,751 B2* | 3/2011 | Reznik et al. | 370/469 |
| 2005/0174962 A1 | 8/2005 | Gurevich | |
| 2007/0010285 A1 | 1/2007 | Schmidt | |
| 2009/0093267 A1* | 4/2009 | Ariyur | 455/522 |
| 2009/0190589 A1* | 7/2009 | Bains et al. | 370/392 |
| 2009/0258670 A1 | 10/2009 | Juang, Jr. | |
| 2010/0136910 A1* | 6/2010 | Lee et al. | 455/41.2 |
| 2010/0144333 A1 | 6/2010 | Kiasaleh et al. | |
| 2011/0231640 A1* | 9/2011 | Avadhanam | 713/2 |
| 2011/0280209 A1* | 11/2011 | Wegener | 370/329 |
| 2012/0033620 A1* | 2/2012 | Thoen et al. | 370/329 |

OTHER PUBLICATIONS

Applicant's Response to Combined Search and Examination Report for GB Application No. GB1111160.6 dated Oct. 28, 2011 (11 pgs.).

Notification of Allowance for GB Application No. GB1111160.6, dated Nov. 7, 2012 (2 pages).

International Search Report and Written Opinion for Application No. PCT/IB2012/053279 dated Oct. 19, 2012.

* cited by examiner

PROCESSOR ARRANGEMENT FOR MULTI
MODE WIRELESS DEVICE

CROSS-REFERENCE TO RELATED
APPLICATIONS

This application is a continuation of U.S. application Ser. No. 13/173,767, filed Jun. 30, 2011, which is hereby incorporated herein in its entirety by reference. This application also claims priority to and the benefit of United Kingdom patent application number GB 1111160.6, filed on Jun. 30, 2011.

FIELD OF THE INVENTION

The present invention relates to a processor arrangement for a multi mode wireless device.

BACKGROUND OF THE INVENTION

Multi mode wireless devices that are compatible with more than one form of data transmission or network are known. Such devices include for example mobile devices such as mobile phones, personal digital assistants, etc., and M2M (machine-to-machine) gateway devices. A particular type of multi mode wireless device, often termed a dual mode device, contains both cellular and non-cellular radios which are used for voice and data communication respectively. Examples of cellular technologies include GSM (Global System for Mobile Communications), CDMA (Code Division Multiple Access), W-CDMA (Wideband Code Division Multiple Access) and LTE (Long Term Evolution), though many others are known. Examples of non-cellular technologies include WLAN IEEE802.11 and BLUETOOTH® wireless technology, though again many others are known.

In typical prior art approaches, the hardware for the cellular aspect of the dual band wireless device is provided in addition to and, in essence, separately of the hardware for the non-cellular aspect of the dual band wireless device. This is shown schematically in FIG. 1 which shows schematically some of the internal components of a prior art dual band wireless device 10. There are entirely separate hardware components for each of the cellular and non-cellular radios, including in particular the radio frequency parts 20,30, the processor(s) 21,31 for the layer 1 processing, and the processor(s) 22,32 for the layer 2 and above processing, for each of the cellular and non-cellular radios. It will be understood that the term "layer" here is used in the context of the Open Systems Interconnection (OSI) model, in which layer 1 is the physical layer, layer 2 is the data link layer, etc.

FIG. 2 shows the arrangement of processors (which may each be individual chips or plural chips, optionally provided as a chipset) of one particular example of this prior art in more detail. On the cellular side (upper part of the diagram), there are separate processors 21,22 for the layer 1 processing and for the layer 2 and above processing respectively, each with their own software 23,24 and in communication with each other via an interconnect 25. Similarly, on the non-cellular side (lower part of diagram), there are separate processors 31,32 for the layer 1 processing and for the layer 2 and above processing respectively, each with their own software 33,34 and in communication with each other via an interconnect 35. In general, there is typically no communication between the cellular and non-cellular sides of the device 10.

This duplication of hardware inevitably raises costs and increases power consumption in use, and also increases the space required within the wireless device for the radio components. Power consumption is a particular concern when the cellular and non-cellular components are to be used simultaneously. This happens for example in the case of a mobile device used to transmit/receive both telephone calls and data simultaneously on cellular and non-cellular networks respectively, and in a M2M (machine-to-machine) gateway type device where data is simultaneously received and transmitted (typically on a non-cellular network and on a cellular network respectively, though other arrangements are possible).

A software-defined radio system (or SDR) is a radio communication system where components that have been typically been implemented in the past in hardware (such as mixers, filters, amplifiers, modulators/demodulators, detectors, etc.) are instead implemented by means of software running on a personal computer or some embedded computing device such as a programmable processor. A SDR is inherently flexible in that in principle it can be reprogrammed to provide services according to different telecommunications standards. However, compared to a conventional non-SDR radio system having bespoke hardware, a SDR is relatively inefficient on power usage and often has poor dynamic range.

In US-B2-7817579, there is disclosed an access point for a network, which is used to allow mobile devices to connect wirelessly to the network. The access point has plural software defined radios (SDRs), including in particular SDR programmable logic blocks which configure plural physical layer (layer 1) blocks. The corresponding MAC (layer 2) blocks may be implemented in part or fully by a single processor. Nevertheless, there is shown only a single radio front end, indicating that only one of the SDRs can be active at any particular time, and also no discussion of integration of hardware that concerns higher layers above level 2.

US-A1-2010/0144333 discloses a SDR that includes a programmable cellular radio front end and a programmable baseband processor. The cellular radio front end can be reconfigured so as to support a non-cellular transmission standard. Again, there is only a single radio front end and the SDR cannot be communicating with a cellular network and a non-cellular network simultaneously.

SUMMARY OF THE INVENTION

According to a first aspect of the present invention, there is provided a processor arrangement for a multi mode wireless device that is capable of communicating with cellular and non-cellular networks simultaneously, the processor arrangement comprising: a first processor and a second processor, the first and second processors being in communication with each other; the first processor being arranged to provide control processing for physical layer 1 processing for both the cellular radio communications and the non-cellular radio communications of a said multi mode wireless device in parallel; and, the second processor being arranged to provide processing for data link layer 2 for both the cellular radio communications and the non-cellular radio communications of a said multi mode wireless device in parallel.

In this aspect, a processor arrangement is provided for a device that is capable of operating simultaneously with a cellular network (such as GSM, CDMA, W-CDMA, LTE, etc., etc.) and with a non-cellular network (such as WLAN IEEE802.11, BLUETOOTH® wireless technology, etc.). This simultaneous operation is achieved whilst keeping down the amount of silicon hardware required, which keeps down manufacturing costs, reduce errors that might arise in otherwise complex hardware, reduce power consumption in use and also keep down the space taken up by the hardware components. Moreover, it is expected that future cellular standards (including for example those arising from the 3rd Generation Partnership Project (3GPP)) will incorporate elements from non-cellular or machine-to-machine technology. Arranging the device in this way will facilitate adoption of such standards.

In an embodiment, the first processor is provided by a single chip. In an embodiment, the second processor is provided by a single chip. In an embodiment, the physical layer 1 processing for both the cellular radio communications and the non-cellular radio communications is provided by a single chip. In an other embodiment, the first and second processors are provided by a single chip. In yet another embodiment, the first and second processors and the physical layer 1 processing for both the cellular radio communications and the non-cellular radio communications are provided by a single chip. All of these embodiments serve to keep down the number of silicon devices that need to be used to provide the required functionality.

In an embodiment, the second processor is arranged to provide processing for all layers above data link layer 2 for both the cellular radio communications and the non-cellular radio communications in parallel. Historically, processing for layers above data link layer 2 have been carried out in separate processors, provided by separate chips, for the cellular and the non-cellular radio communications. This embodiment goes against the trend and furthermore combines the layer 2 processing with processing for layers above layer 2 into the one processor.

In an embodiment, the first and second processors are dynamically reconfigurable such that: the first processor can be selectively reconfigured to provide control processing for both physical layer 1 processing and processing for data link layer 2 for the cellular radio communications, and the second processor can be selectively reconfigured to provide control processing for both physical layer 1 processing and processing for data link layer 2 for the non-cellular radio communications. This embodiment provides a flexible arrangement that can be reconfigured to separate out the control and processing of the cellular radio communications and the non-cellular radio communications to the first and second processors respectively if needs require.

In an embodiment, the first and second processors are dynamically reconfigurable such that: the first processor and the second processor can be reconfigured to provide shared control processing for both physical layer 1 processing and processing for data link layer 2 selectively for the cellular radio communications or the non-cellular radio communications. In this embodiment, all of the processor resources are allocated to cellular-only or non-cellular-only use if required, which allows the arrangement to achieve high single-mode performance.

There is also provided a multi mode wireless device, the device comprising: a radio frequency front end for communicating with both a cellular network and a non-cellular network; and a processor arrangement as described above; whereby the multi mode device is capable of operating simultaneously with a cellular network and with a non-cellular network.

There is also provided a multi mode wireless device, the device comprising: a radio frequency front end for communicating with a cellular network; a radio frequency front end for communicating with a non-cellular network; and a processor arrangement as described above; whereby the multi mode device is capable of operating simultaneously with a cellular network and with a non-cellular network.

According to a second aspect of the present invention, there is provided a processor arrangement for a multi mode wireless device that is capable of communicating with cellular and non-cellular networks, the processor arrangement comprising: a first processor and a second processor, the first and second processors being in communication with each other; the first processor being arranged to provide control processing for physical layer 1 processing for both the cellular radio communications and the non-cellular radio communications of a said multi mode device in parallel; and, the second processor being arranged to provide processing for data link layer 2 and all layers above layer 2 in a said device for both the cellular radio communications and the non-cellular radio communications of a said multi mode device in parallel.

In this aspect of the invention, there are shared processors and in particular a shared processor that provides processing for layer 2 and all layers in the device above layer 2.

There is also provided a multi mode wireless device, the device comprising: a radio frequency front end for communicating with both a cellular network and a non-cellular network; and a processor arrangement as described above.

There is also provided a multi mode wireless device, the device comprising: a radio frequency front end for communicating with a cellular network; a radio frequency front end for communicating with a non-cellular network; and a processor arrangement as described above.

It will be understood that many of the principles and teachings of the present invention can be applied to SDRs (software-defined radios) and non-SDRs (i.e. those of the more traditional type in which most, if not all, of the communication functions, including particularly those on the physical layer 1, are carried out by fixed, dedicated hardware).

Further features and advantages of the invention will become apparent from the following description of preferred embodiments of the invention, given by way of example only, which is made with reference to the accompanying drawings.

DETAILED DESCRIPTION OF THE INVENTION

Figure 1:
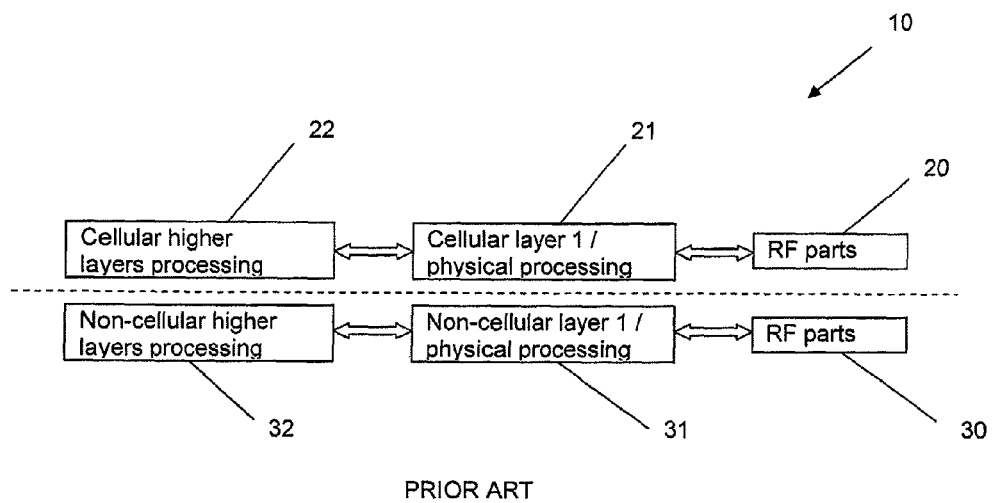
FIG. 1 shows schematically some of the internal components of a prior art dual band wireless device.
Figure 2:
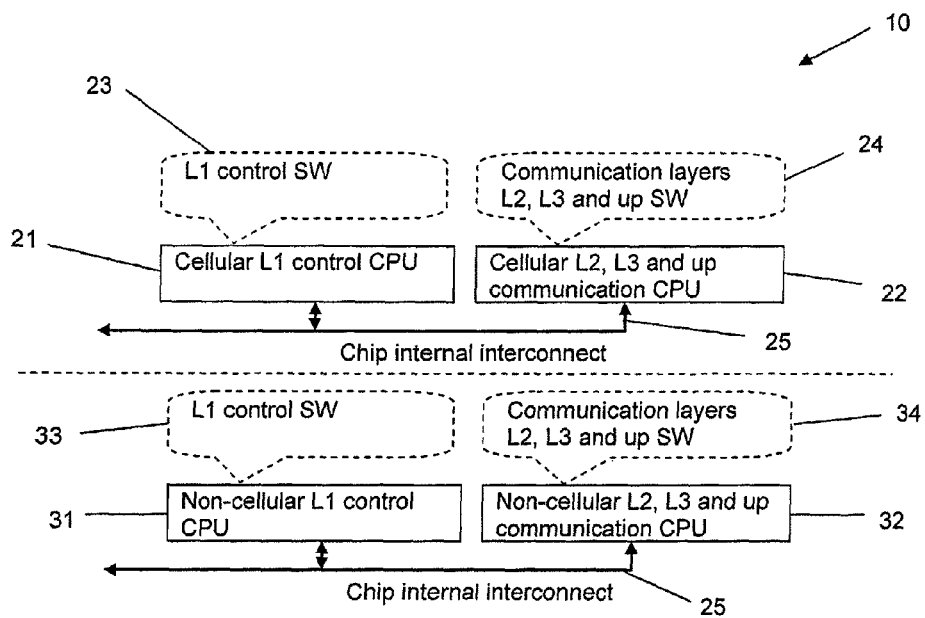
FIG. 2 shows schematically some of the internal components of the prior art dual band wireless device of FIG. 1 in more detail.
Figure 3:
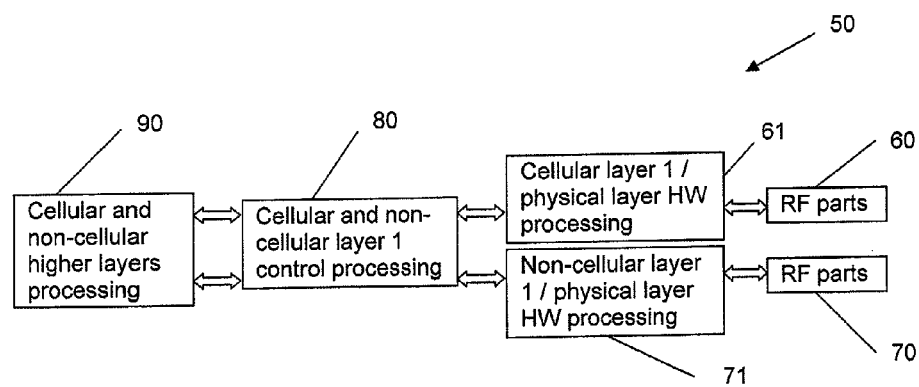
FIG. 3 shows schematically some of the internal components of an example of a dual band wireless device in accordance with an embodiment of the present invention.

Referring to FIG. 3, there is shown schematically the main hardware components of an example of a multi mode wireless device 50 according to an embodiment of the present invention. This example is a dual mode device 50 capable of operating on both cellular and non-cellular networks, and, in the preferred embodiments, in general is capable of operating on both cellular and non-cellular networks simultaneously. This has the advantage for example that the device 50 can be used for voice communication (via the cellular network) and be in data communication (via the non-cellular network) simultaneously. A user can therefore be receiving or transmitting a data file and holding a telephone voice conversation on the device at the same time. As another example, a M2M (machine-to-machine) gateway type device can simultaneously receive data and transmit data (typically on a non-cellular network and on a cellular network respectively, though other arrangements are possible).

In this example, the device 50 has a separate radio frequency (RF) front end 60,70 for each of the cellular and non-cellular networks. Similarly, the device 50 has separate hardware 61,71 (specifically a processor 61,71 provided by one or more chips) for carrying out the physical layer 1 processing for each of the cellular and non-cellular networks. In general however, some components of the RF front ends 60,70 and separately of the physical layer 1 processors 61,71 may be shared. In a particular example, the whole of the radio front end may be shared such that there is a single radio front end that communicates with both cellular and non-cellular networks.

The device 50 has a processor 80 on which runs software to provide control processing for the physical layer 1 processes which are running on both the processors 61,71 carrying out the physical layer 1 processing for the cellular and non-cellular networks respectively. In other words, the processor 80 for controlling the layer 1 processes is effectively shared between the cellular and non-cellular sides so as to control both sets of physical layer 1 processing. It will be understood that the processor 80 may be provided by a single chip or plural chips for example, but nevertheless constitutes a single processor that is shared between the cellular and non-cellular sides in this configuration.

The device 50 further has a processor 90 on which runs software to provide processing for communication layers 2 and 3, and optionally for further layers above level 3, for the cellular and non-cellular networks respectively. In other words, the processor 90 for the layer 2 and above processes is effectively shared between the cellular and non-cellular sides. It will be understood that the processor 90 may be provided by a single chip or plural chips for example, but nevertheless constitutes a single processor that is shared between the cellular and non-cellular sides in this configuration.

Figure 4:
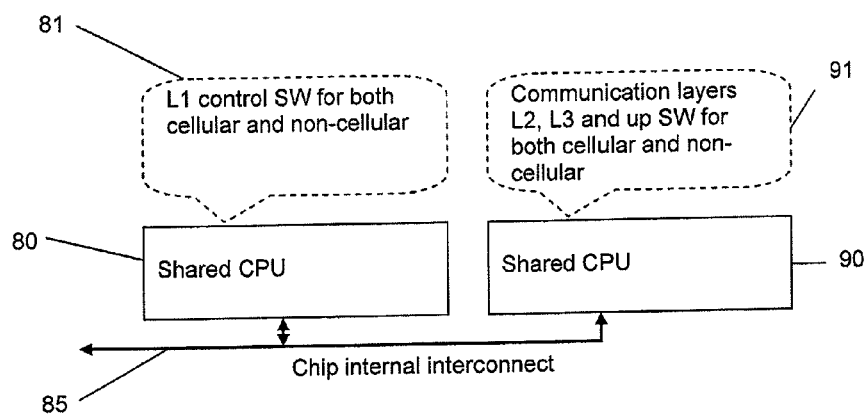
FIG. 4 shows schematically some of the internal components of the device of FIG. 3 in more detail; and, FIG. 5 shows schematically the internal components of FIG. 4 in an alternative configuration.

Referring now to FIG. 4, the two shared processors 80,90 are seen to be in communication with each other (and optionally with other components in the device 50) via a chip internal interconnect 85. The software 81 running on the layer 1 control processor 80 enables the processor 80 to control the layer 1 processes for both the cellular and non-cellular networks in parallel and therefore in effect simultaneously. Similarly, the software 91 running on the layer 2 and above processor 90 enables the processor 90 to run the layer 2 and above processes for both the cellular and non-cellular networks in parallel and therefore in effect simultaneously. It will be understood that the processors 80,90 (and more specifically the chip or chips that constitute those processors 80,90), as well as any supporting logic devices and other circuitry in the device 50, must be sufficiently powerful to handle the parallel processing that is required by the respective processors 80,90 to operate the level 1, level 2, level 3, etc. functions of the cellular and non-cellular radios described above simultaneously. This can be achieved if necessary by for example providing relatively fast processors and duplicating certain hardware blocks within the chips, and/or by making use of hardware semaphores to control access by the cellular and non-cellular processes to the same hardware blocks.

Figure 5:
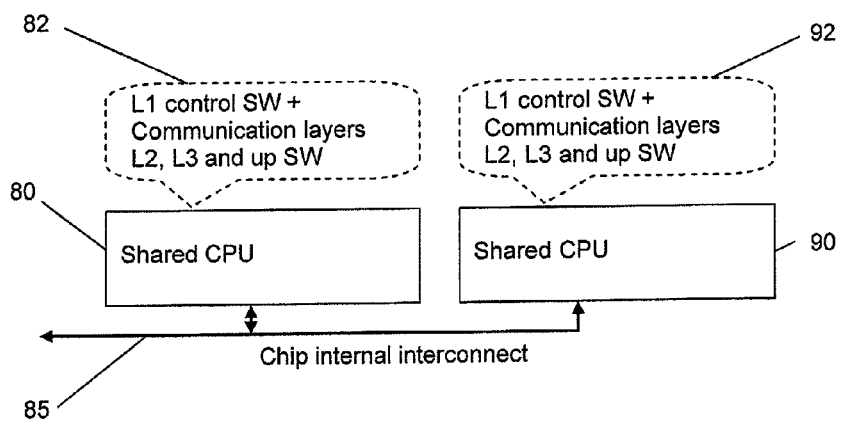

Referring now to FIG. 5, in one embodiment, the device 50 can reconfigure the processors 80,90 so that, in essence, one processor 80 deals with the control processing for the physical layer 1 processes and the processing for communication layers 2, 3 and up for the cellular network, and the other processor 90 deals with the control processing for the physical layer 1 processes and the processing for communication layers 2, 3 and up for the non-cellular network. This can be achieved by for example modifying the software running on the processors 80,90 to provide appropriate software 82,92 on the respective processors 80,90. Again, the processors 80,90 (and more specifically the chip or chips that constitute those processors 80,90), as well as any supporting logic devices and other circuitry in the device 50, must be sufficiently powerful to handle the parallel processing that is required for this variant of the parallel operation.

In another embodiment, the device 50 can reconfigure the processors 80,90 so that both are dedicated exclusively to either cellular or non-cellular use as circumstances may require. This single-mode operation provides high performance, which may be useful in regions of poor reception for voice calls or when large amounts of data are to be transmitted or received for example.

The reconfiguring of the processors 80,90 in both the circumstances mentioned above is preferably carried out dynamically, "on-the-fly", as circumstances require, with the device 50 returning to its normal mode of operation (as shown schematically in FIGS. 3 and 4 for example) when possible.

Figure 6:
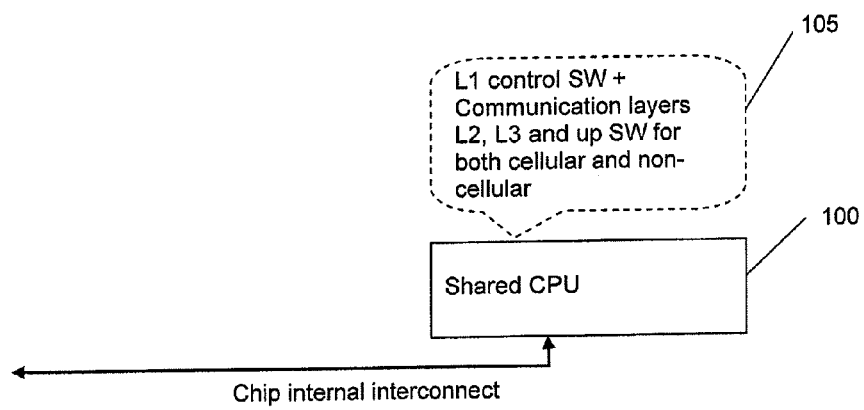
FIG. 6 shows schematically some of the internal components of another example of a dual band wireless device in accordance with another embodiment of the present invention.

Whilst in the above description the device 50 has been described in terms of having separate processors 80,90 (each of which may be constituted by one or more chips), in fact the two processors 80,90 may be constituted by a single chip or set of chips (forming a single chipset for example). Indeed, such a single chip or set of chips may also provide the processors 61,71 that carry out the physical layer 1 processing for the cellular and non-cellular networks respectively. A particular example of this is shown schematically in FIG. 6, where there is shown just one single shared CPU resource 100, which may be implemented by a single chip, running software 105 which is used for all cellular and non-cellular processing, for all communication layers from L1 upwards for cellular and non-cellular processing, to enable concurrent parallel processing of both cellular and non-cellular radios. The CPU 100 and the surrounding logic devices and other circuitry in the device 50 are again sufficiently powerful to handle the parallel processing required for all of the level 1, level 2, level 3, etc. parts of the cellular and non-cellular functions so that cellular and non-cellular radios can be operated simultaneously in parallel. In addition, similar to the above examples, the CPU 100 may be allocated to either cellular-only or non-cellular-only use as needed to provide more performance in a single-mode operation.

The above embodiments are to be understood as illustrative examples of the invention. Further embodiments of the invention are envisaged. For example, the description above is primarily in terms of a dual mode device, capable of operating with cellular and non-cellular networks, and preferably simultaneously. The device may be arranged to operate with more than two types of networks (with for example a corresponding number of processors) so can operate for example with two different types of non-cellular networks and one cellular network simultaneously, two different types of non-cellular networks and two different types of cellular networks simultaneously, etc. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A processor arrangement for a multi mode wireless device for communicating with cellular and non-cellular networks simultaneously, the processor arrangement comprising:
   a first processor and a second processor, the first and second processors being in communication with each other;
   the first processor being arranged to provide control processing for physical layer 1 processing for both the cellular radio communications and the non-cellular radio communications of said multi mode wireless device simultaneously and in parallel; and,
   the second processor being arranged to provide processing for data link layer 2 for both the cellular radio communications and the non-cellular radio communications of said multi mode wireless device simultaneously and in parallel.

2. A processor arrangement according to claim 1, wherein the first processor is provided by a single chip.

3. A processor arrangement according to claim 2, wherein the second processor is provided by a single chip.

4. A processor arrangement according to claim 1, wherein the physical layer 1 processing for both said cellular radio communications and said non-cellular radio communications is provided by a single chip.

5. A processor arrangement according to claim 1, wherein the first and second processors are provided by a single chip.

6. A processor arrangement according to claim 1, wherein the first and second processors and the physical layer 1 processing for both said cellular radio communications and said non-cellular radio communications are provided by a single chip.

7. A processor arrangement according to claim 1, wherein the second processor is arranged to provide processing for one or more layers above data link layer 2 for both the cellular radio communications and the non-cellular radio communications in parallel.

8. A processor arrangement according to claim 1, wherein the first and second processors are dynamically reconfigurable such that:
   the first processor can be selectively reconfigured to provide control processing for both physical layer 1 processing and processing for data link layer 2 for said cellular radio communications, and
   the second processor can be selectively reconfigured to provide control processing for both physical layer 1 processing and processing for data link layer 2 for said non-cellular radio communications.

9. A processor arrangement according to claim 1, wherein the first and second processors are dynamically reconfigurable such that:
   the first processor and the second processor can be reconfigured to provide shared control processing for both physical layer 1 processing and processing for data link layer 2 selectively for said cellular radio communications or said non-cellular radio communications.

10. A multi mode wireless device, the device comprising:
    a radio frequency front end for communicating with both a cellular network and a non-cellular network; and
    a processor arrangement according to claim 1.

11. A multi mode wireless device comprising a processor arrangement according to claim 1, the device further comprising:
    a radio frequency front end for communicating with a cellular network; and
    a radio frequency front end for communicating with a non-cellular network.

12. A multi mode wireless device for communicating with cellular and non-cellular networks, the multi mode wireless device comprising:
    a first processor and a second processor, the first and second processors being in communication with each other;
    the first processor being arranged to provide control processing for physical layer 1 processing for both the cellular radio communications and the non-cellular radio communications of said multi mode wireless device simultaneously and in parallel; and,
    the second processor being arranged to provide processing for data link layer 2 and all one or more layers above layer 2 in said multi mode wireless device for both the cellular radio communications and the non-cellular radio communications of said multi mode wireless device simultaneously and in parallel.

13. The multi mode wireless device according to claim 12, wherein the first processor is provided by a single chip.

14. The multi mode wireless device according to claim 13, wherein the second processor is provided by a single chip.

15. The multi mode wireless device according to claim 12, wherein the physical layer 1 processing for both the cellular radio communications and the non-cellular radio communications is provided by a single chip.

16. The multi mode wireless device according to claim 12, wherein the first and second processors are provided by a single chip.

17. The multi mode wireless device according to claim 12, wherein the first and second processors and the physical layer 1 processing for both the cellular radio communications and the non-cellular radio communications are provided by a single chip.

18. The multi mode wireless device according to claim 12, wherein the first and second processors are dynamically reconfigurable such that:
    the first processor can be selectively reconfigured to provide control processing for both physical layer 1 processing and processing for data link layer 2 and one or more layers above layer 2 for the cellular radio communications, and
    the second processor can be selectively reconfigured to provide control processing for both physical layer 1 processing and processing for data link layer 2 and one or more layers above layer 2 for the non-cellular radio communications.

19. The multi mode wireless device according to claim 12, wherein the first and second processors are dynamically reconfigurable such that:
    the first processor and the second processor can be reconfigured to provide shared control processing for both physical layer 1 processing and processing for data link layer 2 and one or more layers above layer 2 selectively for the cellular radio communications or the non-cellular radio communications.

20. The multi mode wireless device according to claim 12, the multi mode wireless device further comprising:
    a radio frequency front end for communicating with both a cellular network and a non-cellular network.

21. The multi mode wireless device according to claim 12, the multi mode wireless device further comprising:
- a radio frequency front end for communicating with a cellular network; and
- a radio frequency front end for communicating with a non-cellular network.

\* \* \* \* \*